United States Patent [19]
Allison

[11] 3,887,027
[45] June 3, 1975

[54] STEERING MECHANISM WITH LATERAL FORCE CORRECTION

[75] Inventor: William D. Allison, Grosse Pointe Farms, Mich.

[73] Assignee: Ford Motor Company, Dearborn, Mich.

[22] Filed: Sept. 24, 1973

[21] Appl. No.: 400,440

[52] U.S. Cl. .......................... 180/79.2; 180/79.2 F
[51] Int. Cl. ............................................. B62d 5/08
[58] Field of Search ..... 180/79.2 R, 79.2 D, 79.2 F; 280/112 A; 91/427

[56] References Cited
UNITED STATES PATENTS
2,859,592 11/1958 Mercier et al. ................ 180/79.2 X
3,011,579 12/1951 Milliken ......................... 180/79.2 R

FOREIGN PATENTS OR APPLICATIONS
1,196,974 7/1965 Germany ....................... 180/79.2 R
163,908 11/1964 U.S.S.R. ........................ 180/79.2 R

*Primary Examiner*—David Schonberg
*Assistant Examiner*—John A. Pekar
*Attorney, Agent, or Firm*—Clifford L. Sadler; Keith L. Zerschling

[57] ABSTRACT

The present invention relates to power steering mechanisms for motor vehicles, and more particularly to a steering mechanism having means for compensating for lateral forces on the vehicle such as caused by a cross wind. The mechanism includes a power steering valve having two control means. The first control means is connected to a steering gear actuator and is responsive to the steering load placed upon the steering gear by turning the steering wheel. The second valve control means is connected to the vehicle's front suspension system and controls the power steering valve in response to lateral forces which cause lateral movement of the suspension arms.

7 Claims, 12 Drawing Figures

STEERING MECHANISM WITH LATERAL FORCE CORRECTION

BACKGROUND OF THE INVENTION

The present invention is related to motor vehicle steering systems. Lateral forces such as cross winds acting upon a motor vehicle will cause it to deviate from a course established by the vehicle operator. If the cross wind is gusty, the vehicle operator will have to make repeated corrective movements of the steering wheel in order to keep the vehicle on the intended course. These constant corrective movements of the steering wheel can be tiring to the operator.

Therefore, it is the principal object of the present invention to provide a steering mechanism which automatically compensates for lateral forces upon the vehicle.

SUMMARY OF THE INVENTION

According to one preferred embodiment of the present invention, a power steering system is provided having a steering gear actuator with a pair of chain sprockets connected to a steering wheel. A second set of chain sprockets is connected to the pinion of a rack and pinion steering gear. A pair of roller type chains drivingly interconnect the two pairs of sprockets. A resiliently mounted chain tensioner engages portions of the drive chain extending between the two sets of sprockets. The chain tensioner functions to control slack in the chains. The chain tensioner is also constructed to be displaced when a steering load is transmitted through the chains from one set of sprockets to the other.

The power steering system includes a valve that interconnects a fluid pressure source and a power steering booster cylinder. The power steering valve has a valve sleeve element and a valve spool element that function to control and direct pressure fluid flow.

The power steering valve engages the chain tensioner and is arranged to have its valve spool element displaced in response to the displacement of the chain tensioner. When the steering wheel is rotated manually by the vehicle operator for steering purposes, the load on the drive chains interconnecting the two pairs of sprockets is sensed by the chain tensioner and the tensioner is displaced thereby. The valve spool element of the power steering valve is shifted by the displacement of the tensioner and this valve displacement directs pressure fluid from the pressure source to a booster cylinder that will exert a force to assist in the steering operation.

The valve sleeve element surrounds the spool valve and is connected by a linkage system to the suspension arms for the front wheels of the vehicle. The suspension arms are connected to the vehicle frame by resilient bushings. In response to a lateral force upon the vehicle, such as caused by strong cross wind, the suspension arms will be displaced laterally with respect to the vehicle frame. The linkage system interconnecting the valve sleeve element and the suspension arms will sense the relative displacement between the suspension arms and frame and will thereby cause displacement of the valve sleeve.

Displacement of the valve sleeve will automatically direct pressure fluid from the pressure source to the booster which will displace the steering linkage in a direction that will counteract the effects of the cross wind on the vehicle body.

Without the present invention, the cross wind acting upon the vehicle body would tend to cause the vehicle to deviate from its intended course. With the automatic course correction means of this invention, the steering mechanism will sense the lateral force and automatically bring the vehicle back on course without requiring constant corrective attention by the vehicle operator. The automatic steering means of this invention provides for minor displacement of the front wheel sufficient to compensate for the lateral forces on the vehicle body.

BRIEF DESCRIPTION OF THE DRAWINGS

The many objects and advantages of a motor vehicle steering mechanism constructed in accordance with this invention will become apparent upon consideration of the following detailed description and the accompanying drawings, in which.

DETAILED DESCRIPTION OF THE PREFERRED EMBODIMENT

Figure 1:
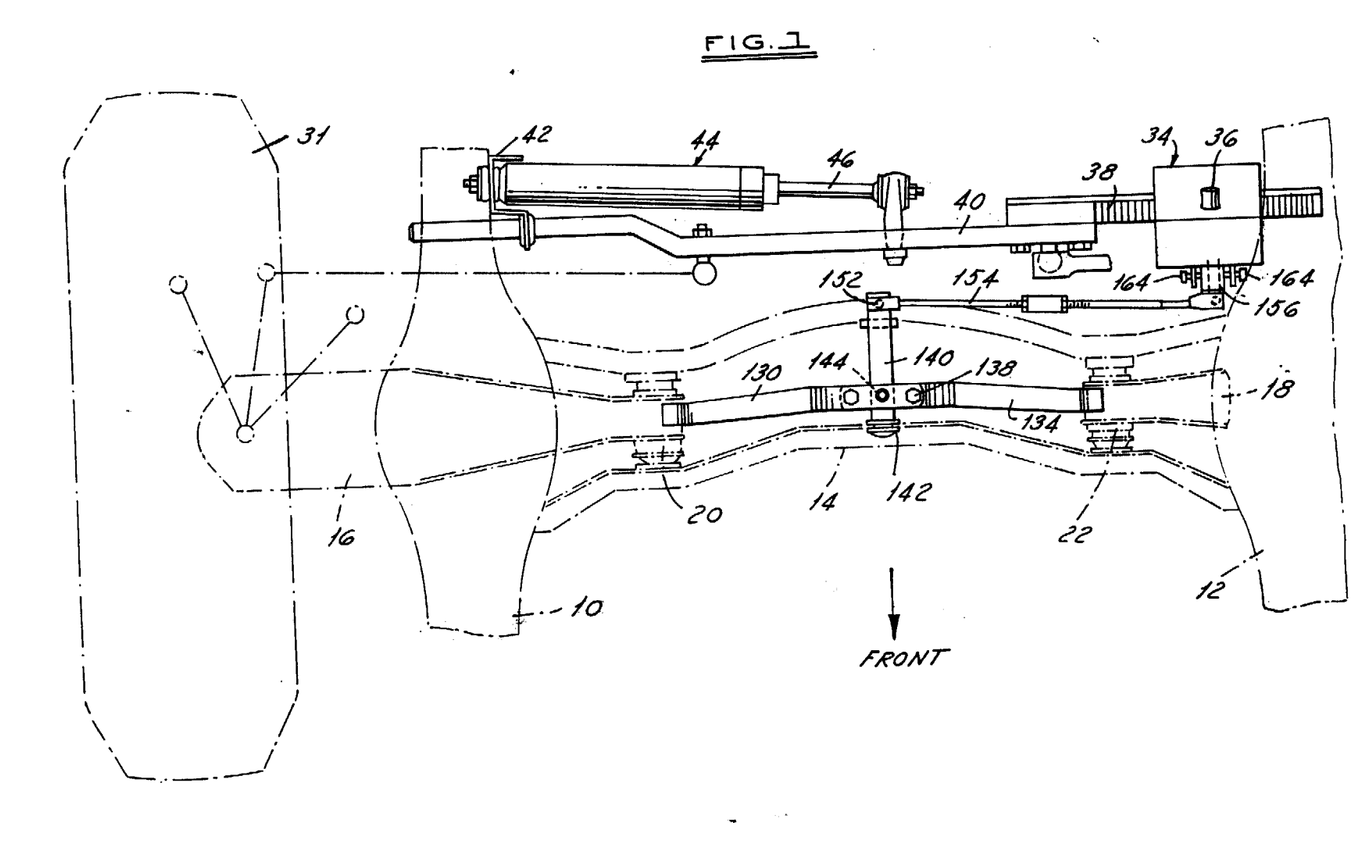
FIG. 1 is a top plan view of a steering mechanism with lateral force correction means arranged in association with the front suspension of a motor vehicle.

The presently preferred embodiment of this invention is shown in the drawings. Referring to FIG. 1, a motor vehicle includes a chassis frame having right and left (as viewed by the vehicle operator) frame side rails 10 and 12 that are interconnected by a frame cross member 14. Right and left lower suspension arms 16 and 18 have their inner ends connected to the frame cross member 14 by resilient bushings 20 and 22.

Figure 6:
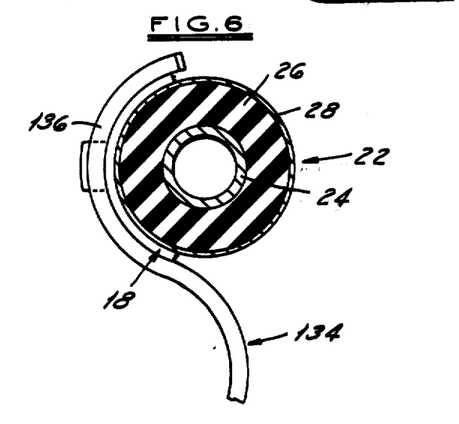
FIG. 6 is a front elevational view, partly in section, showing the connection between the suspension arm bushing and an element of the linkage system that is connected to the power steering valve.

The resilient bushings 20 and 22 each have a construction as shown in FIG. 6 where an inner tubular member 24 receives a bolt for attachment of the bushing 22 to the frame cross member 14. An annular rubber element 26 surrounds the tube 24 and an outer tube 28 surrounds the rubber 26. The inner end of the suspension arm 18 is provided with an opening in which the outer tube 28 of the bushing 22 is secured by a press fit.

The outer ends of the right and left suspension arms 16, 18 are connected to wheel spindles 30 that support the right and left dirigible road wheels 31 and 32. The independent front suspension is completed by a pair of short upper suspension arms which interconnect the wheel spindles 30 and the frame cross member 14.

Figure 7:
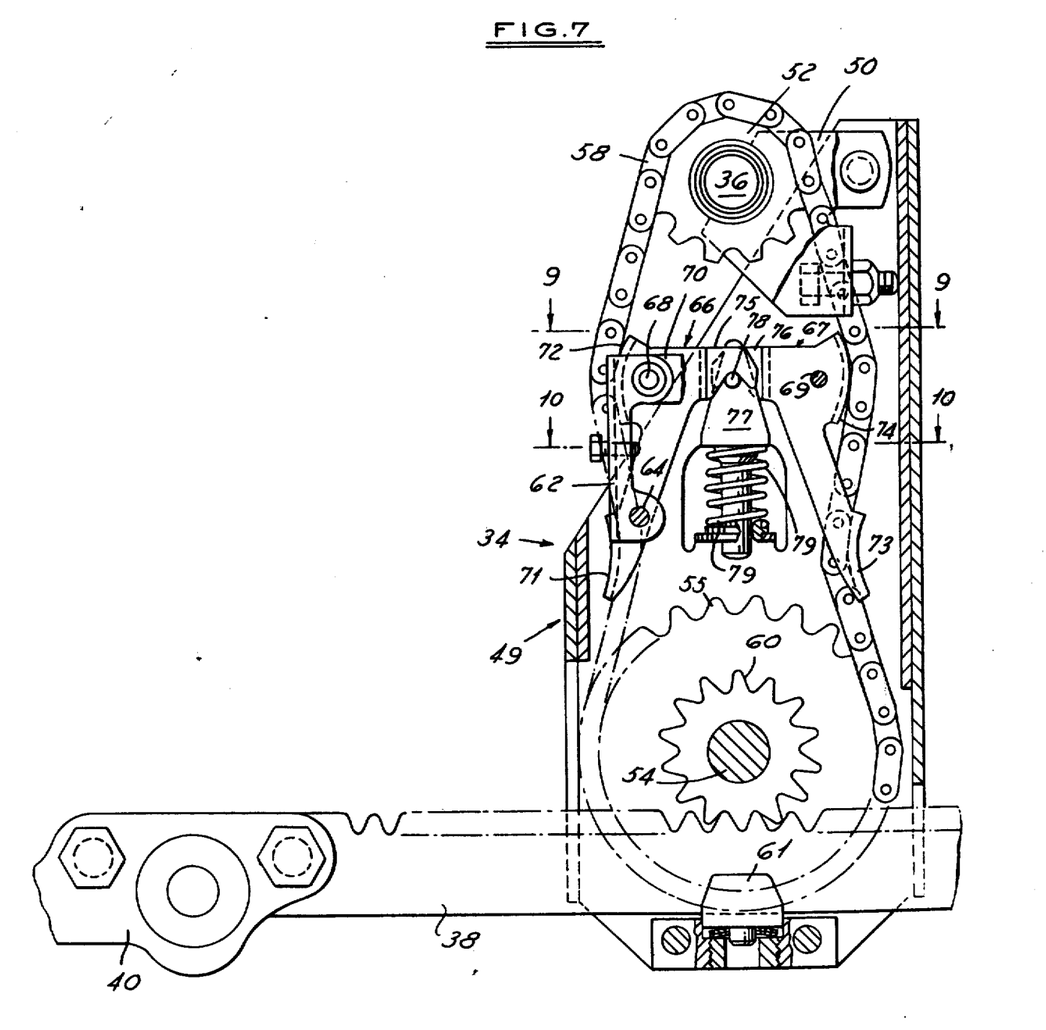
FIG. 7 is a front elevational view of the steering gear and the steering gear actuator portion of the mechanism of FIG. 1 with portions broken away to show the internal construction.
Figure 8:
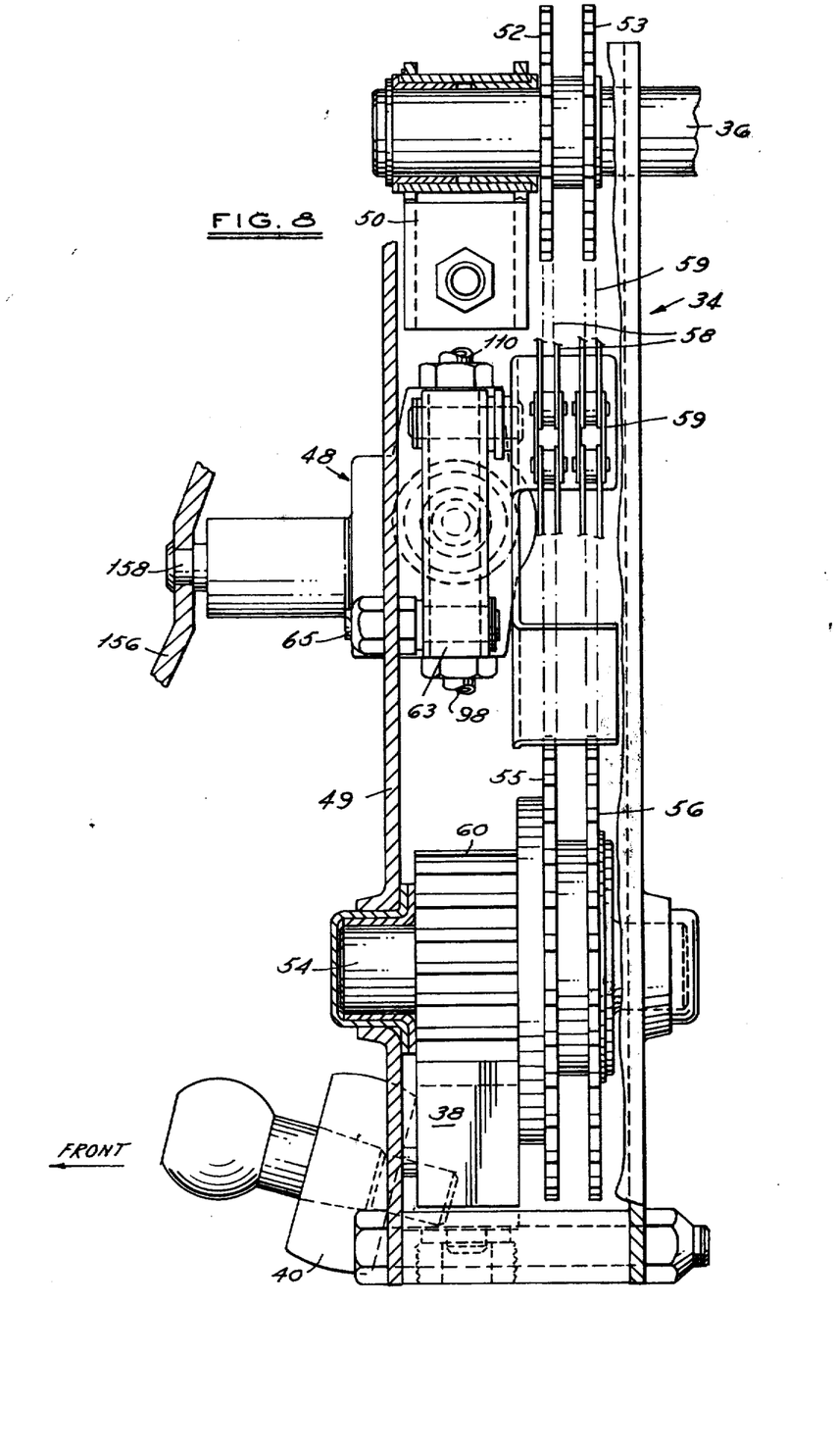
FIG. 8 is a side elevational view of the steering gear and steering gear actuator of FIG. 7.

Steering means is provided in accordance with this invention for angularly displacing the dirigible wheels 31 and 32. Referring to FIG. 7, the motor vehicle of FIG. 1 has a power steering system that includes a chain driven power steering gear actuator assembly 34. The assembly 34 is supported on the left frame side rail 12 by a bracket (not shown).

The assembly 34 includes an input shaft 36 that is constructed to be connected to a vehicle steering wheel. The output member of the assembly 34 comprises a linearly displaceable toothed rack 38 that extends transversely of the vehicle. The input shaft 36 is connected to the rack 88 by means that will be described in detail later.

The rack 38 is connected to a link 40 of the vehicle's steering linkage system. The right end (as viewed by the vehicle operator) of the link 40 is slidably supported by a bracket 42 connected to the right-hand frame side rail 10. A power steering booster cylinder 44 has the outboard end of its cylinder connected to the bracket 42. The exposed end of the piston rod 46 of the booster 44 is secured to the steering link 40.

The booster cylinder 44 receives pressure fluid from a fluid pressure source such as a power steering pump (not shown) as directed by power steering valve 48 situated within the steering gear assembly 34.

The steering cross link 40 is coupled by appropriate links to the steering arms of the wheel spindles 30 that support the right and left road wheels 31, 32. Displacement of the steering link 40 to the right (as viewed by the vehicle operator) will cause the wheels 31 and 32 to be angled in the direction for a left-hand turn. Conversely, displacement of the link 40 to the left will cause the wheels 31 and 32 to be canted in the direction for a righthand turn.

The construction of the power steering gear assembly 34 includes a housing 49. A bracket 50 within the housing 49 rotatably supports the forward end of the steering shaft 36. A pair of driving or input sprockets 52 and 53 are secured to the steering shaft 36. A shaft 54 is rotatably mounted in the housing 36 and carries a pair of driven or output sprockets 55 and 56. A pair of roller type drive chains 58 and 59 drivingly interconnect the driving sprockets 52, 53 with the driven sprockets 55, 56.

A pinion gear 60 is rigidly affixed to the shaft 54 and engages the teeth of the rack 38. The pinion 60 and the rack 38 form principal elements of a rack and pinion steering gear. A spring pressed wear compensator 61 urges the toothed rack 38 into meshed engagement with the pinion 60.

A resiliently mounted articulated spring tensioner engages portions of the roller chains 58, 59 located between the driving sprockets 52, 53 and the driven sprockets 55, 56. The tensioner functions to control slack in the chain.

Figure 9:
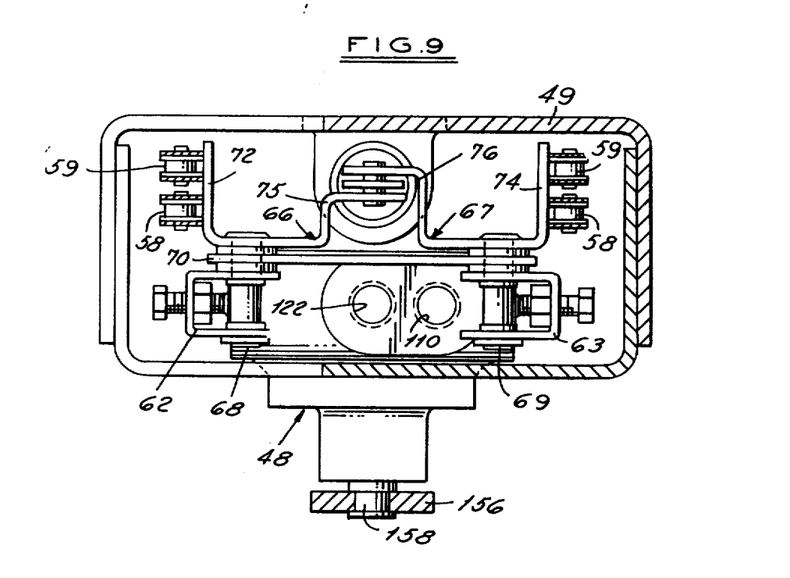
FIG. 9 is a sectional view taken along section line 9—9 of FIG. 7.
Figure 10:
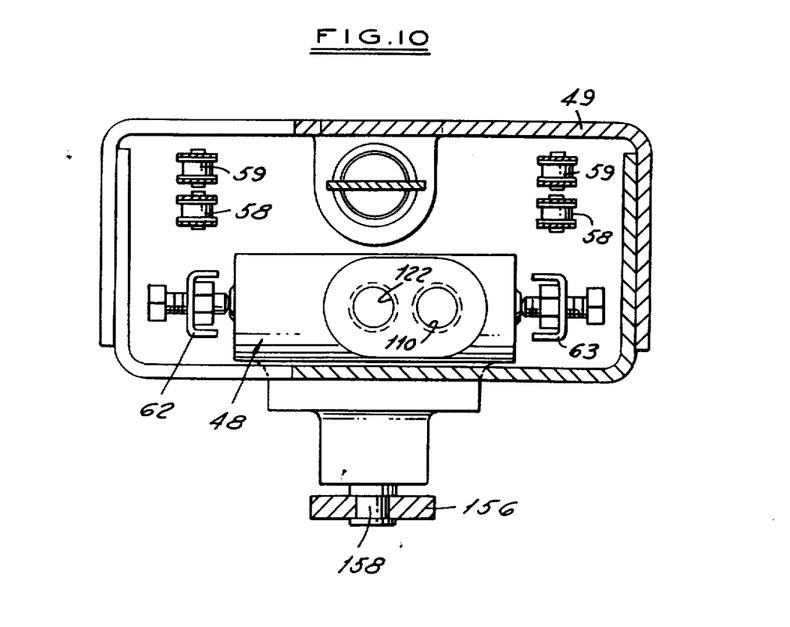
FIG. 10 is a sectional view taken along section line 10—10 of FIG. 7.

The chain tensioner is a linkage mechanism and includes a pair of upstanding links 62 and 63 that are connected to the housing at their lower ends by pivot pins 64 and 65. The upper ends of the upstanding links 62 and 63 are pivotally connected to a pair of L-shape levers 66 and 67 by a pair of pivot pins 68 and 69. A cross link 70 interconnects the pivot pins 68 and 69 as seen in FIG. 9.

The L-shape lever 66 has a depending leg with an arcuate portion 71 that faces inwardly and bears against adjacent portions of the chains 58, 59. The lever 66 has a second arcuate portion 72 that faces outwardly and bears against other portions of the chains 58, 59.

The L-shape lever 67 is similarly constructed and has a depending leg with an inwardly facing arcuate surface 73 that bears against adjacent portions of the chains 58, 59. The lever 67 also has an outwardly facing arcuate bearing surface 74 that engages the chains 58, 59.

The two L-shape lever members 66 and 67 have inwardly extending overlapping arms 75 and 76. A vertically displaceable intermediate member 77 is supported by a flange 78 affixed to the housing 79 and is urged upwardly by a coil spring 79. The upper end of the intermediate member 77 has a cross pin 78 that is seated in aligned knotches in the overlapping arms 75, 76 of the L-shape levers 66, 67.

The spring 78 urges the intermediate member 77 upwardly and L-shape lever 66 in a counterclockwise direction (as seen in FIG. 7) about the pivot pin 68. Similarly, the spring 79 urges the L-shape lever 67 in a clockwise direction about the pivot pin 69.

The biased engagement of the L-shape lever 66 with the portions of the chains 58, 59 spanning the gap between the two pairs of sprockets 52, 53 and 55, 56 urges the chains into an ogee configuration as seen in FIG. 7. Likewise, clockwise rotation of the lever 67 urged by the spring 77 will draw the portions of the chains 58, 59 engaged by the bearing surfaces 73 and 74 into an ogee curve.

The engagement of the levers 66 and 67 with the chains 58 and 59 under the force of the spring 77 controls slack in the chains.

When steering torque is transmitted from the driving or input sprockets 52, 53 to the driven sprockets 55, 56 through the chains 58, 59 portions of the chains will be loaded in tension and will tend to straighten from their normal ogee curve. This will cause lateral dislocation of the linkage elements that constitute the chain tensioner.

Figure 11:
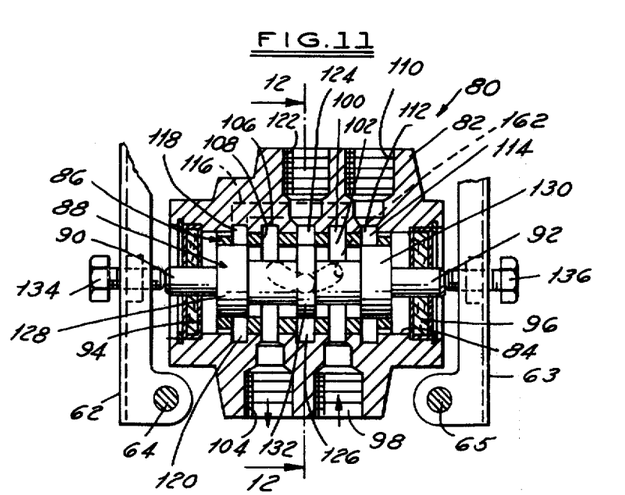
FIG. 11 is a sectional view of the power steering valve taken along section line 11-11 of FIG. 10.

Referring to FIG. 11, the hydraulic power steering valve 48 is situated between upstanding members 62 and 63 of the chain tensioner. The valve 48 comprises a valve body or housing 82 having a central bore 84 in which a valve sleeve 86 is slidably supported. A spool valve element 88 is slidable within the sleeve 86. Valve spool 88 has a pair of protruding ends 90 and 92 of reduced diameter that are slidable within annular seals 94 and 96 that close the ends of the bore 84.

The valve housing 82 has an inlet port 98 that communicates with an annular groove 100 in the surface of the bore 84. The sleeve 86 has a slot 102 that is normally in communication with the groove 100.

A return port 104 is connected to an annular groove 106 in the surface of the bore 84 and it, in turn, is in alignment with a slot 108 in the valve sleeve 86 when the sleeve is in a central position.

A first outlet 110 in the valve housing 82 communicates with an annular groove 112 in the bore 84 which, in turn, is normally in alignment with a slot 114 in the valve sleeve 86. An internal passage 116 connects the outlet port 110 to an annular groove 118 in the bore 84 that is normally aligned with a slot 120 in the sleeve 86.

A second outlet port 122 of the valve 48 communicates with an annular groove 124 in the bore 84 and it, in turn, communicates with a slot 126 in the sleeve 86 when the sleeve is in a central position.

The valve spool element 88 has a pair of end lands 128 and 130 that are normally in alignment with the slots 114 and 120, respectively. A central land 132 on the spool 88 is normally in alignment with the slot 126. Slot 126 is slightly wider than the land 132.

The pressure inlet port 98 of the valve 48 is connected to the fluid pressure source such as a power steering pump. The return port 104 is connected to the reservoir for the fluid pressure source. The first and second outlet ports 110 and 122 of the valve 48 are connected to the fluid pressure chambers situated on either side of the power piston within the booster cylinder 44.

When fluid under pressure is supplied to the booster 44 through the port 110, a force is exerted by the piston rod 46 that will urge the link 40 to the right (as viewed by the vehicle operator) and the vehicle's front wheels 31, 32 in a direction for a left-hand turn. Conversely, fluid pressure from the port 122 will cause the piston rod 46 to retract into the booster cylinder 44 to urge the steering link 40 to the left and the front wheels 31, 32 in a direction for a right-hand turn.

The power steering valve 48 is an open center valve and during normal straight-ahead driving fluid pressure supplied to the port 98 flows through the groove 100 and slot 102, through the slot 126 and across the periphery of the land 132, through the slot 108 and groove 106, and out the return port 104. Both outlet ports 110 and 122 are in communication with return port 104 and, therefore, neither side of the booster cylinder 44 is pressurized.

The upstanding levers 62 and 63 of the chain tensioner have inwardly directed adjustable screws 134, 136 that engage the exposed ends 90 and 92 of the valve spool element 88. When steering torque is applied to the input shaft 36 by turning the vehicle steering wheel and the steering load is transmitted from the driving sprockets 52, 53 to the driven sprockets 55, 56, portions of the chains 58, 59 are placed under tension load. The portions of the chains 58, 59 under tension will tend to straighten and thereby displace the elements of the chain tensioner. The upstanding links 62, 63 will be pivoted a slight amount in a clockwise or counterclockwise direction depending upon the direction in which the driving sprockets 52, 53 are rotated.

Figure 5:
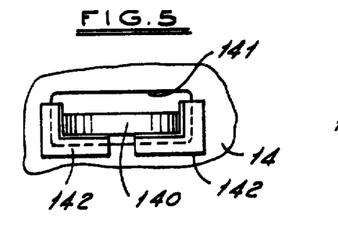
FIG. 5 is a front elevational view showing the fulcrum support for one of the linkage elements upon the vehicle frame.

Referring to FIG. 5, which is a sectional view looking rearwardly of the power steering valve 48, the valve spool 88 will be shifted to the right in response to rotation of the steering wheel and input shaft 36 for a left-hand turn. This movement corresponds to clockwise rotation of the shaft 36 as seen in FIG. 7. Right-hand displacement of the valve spool element 88 will cause the land 132 to seal the previously open communication between the return port 104 and pressure inlet port 98. Outlet port 110 will be sealed off from the return port 104 by the valve lands 128 and 132.

Under these circumstances, pressure fluid will flow through the pressure inlet port 98, through the groove 100 and slot 102, through the slot 114 and groove 112 and out the outlet port 110. Pressure fluid flowing through the outlet port 110 is conveyed to that side of the power booster cylinder 44 which will assist a turn in the left-hand direction.

Return fluid coming from the cylinder 44 due to the displacement of the power piston within the cylinder will flow inwardly through the outlet port 122, the groove 124, the slot 126, the slot 128, the groove 106 and through the return port 104 to the reservoir of the hydraulic pressure source.

When the valve spool element 88 is shifted to the left (as seen in FIG. 11) in response to rotation of the steering wheel for a right-hand turn, the chain portions on the right side of the sprockets (as seen in FIG. 7) will be loaded in tension. The links of the chain tensioner and particularly link 63 will be displaced upon the loading of the chains 58, 59 and counterclockwise displacement of the link 63 will cause leftward movement of the valve spool 88. When the spool 88 is moved to the left, the land 132 will seal off the previously opened communication of the pressure inlet port 98 and of the outlet port 122 with the return port 104. When the valve parts are in this orientation, fluid pressure will flow through pressure inlet port 98, through the various slots and grooves, through the outlet port 122 and to the power booster cylinder 44. The outlet port 110 and the low pressure side of the booster 44 will be placed in communication through the internal passage 116 with the return port 104 and the reservoir for the hydraulic system.

In accordance with the present invention, automatic means is provided for actuating the power steering valve 48 to compensate for side forces on the vehicle such as caused by a cross wind.

Figures 2, 12:
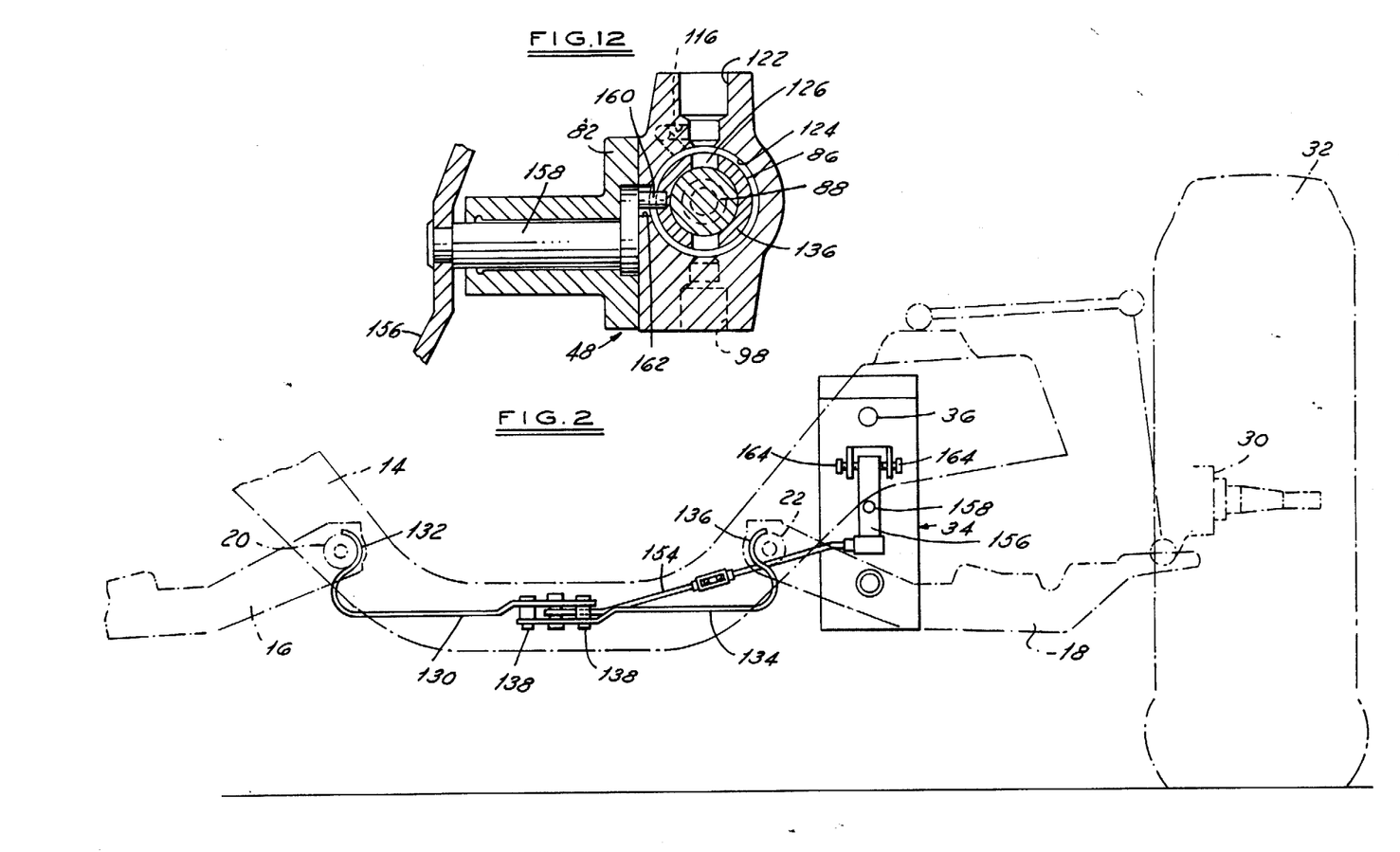
FIG. 2 is a front elevational view looking rearwardly of the mechanism of FIG. 1.
FIG. 12 is a sectional view of the power steering valve taken along section line 12-12 of FIG. 11.
Figure 3:
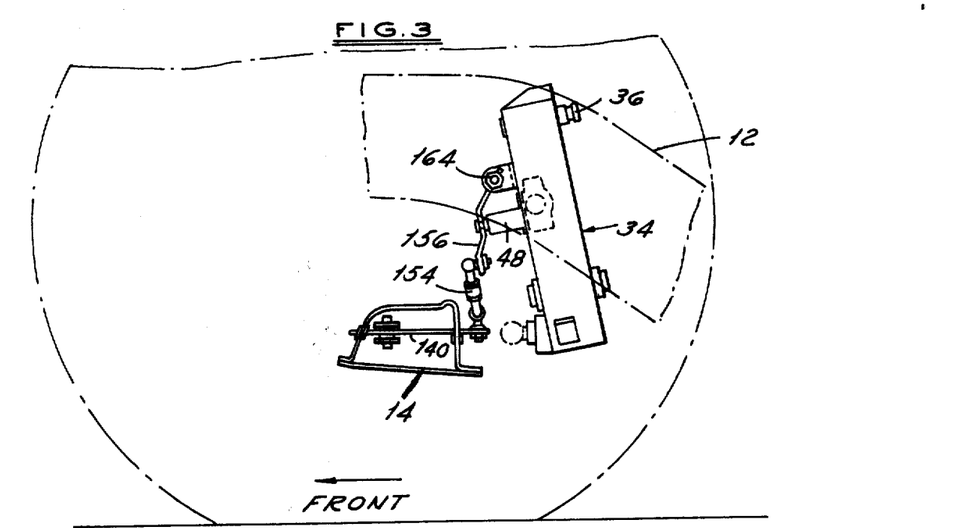
FIG. 3 is a side elevational view of a portion of the mechanism of FIGS. 1 and 2.
Figure 4:
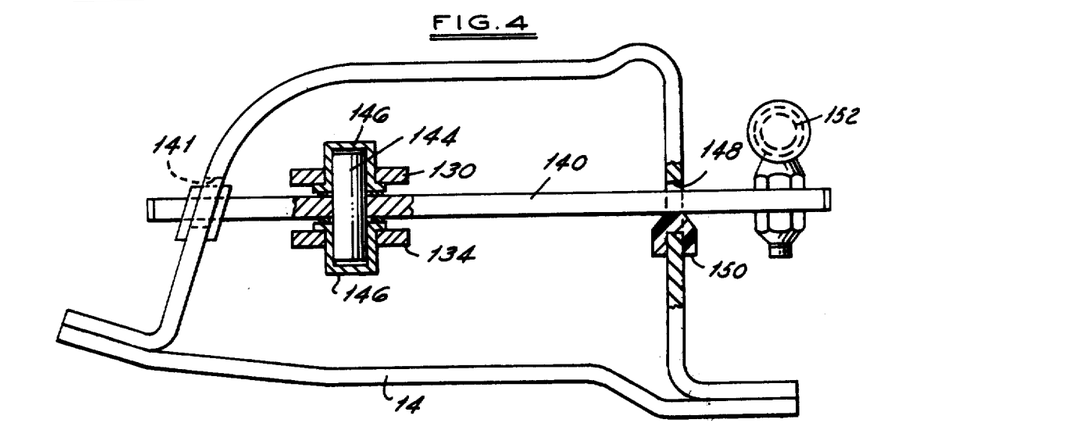
FIG. 4 is an enlarged side elevational view, partly in section, of a portion of the mechanism of FIG. 3.

Referring to FIG. 2, a link 130 has an outwardly facing curved end 132 that engages the inner end of the right suspension arm 16. A second link 134 has a similar outwardly facing curved portion 136 that rests against the inner end of left lower suspension arm 18. The links 130 and 134 extend laterally inwardly and have overlapping inner ends that are joined together in spaced relationship by bolts 138. A longitudinally extending lever 140 has its forward end supported in an aperture 141 in the structure of the frame cross member 14 by bearing pieces 142. This structure is shown in FIG. 5 and provides a fulcrum for the lever 140.

The lever 140 is interposed between the overlapping inner ends of the lateral links 130 and 134 and is arranged at a right angle thereto. It is connected to the links by a vertically arranged pivot pin 144. A pair of hat shape bearing elements 146 are interposed between the ends of the pivot pin 144 and the overlapping ends of the link 130 and 134.

The longitudinal lever 144 extends through an aperture 148 in the structure of the frame cross member 14. It rests upon a bearing piece 150. The aperture 148 has sufficient lateral extent to permit the lever 140 to pivot about the fulcrum bearings 142 at the forward end of the lever through a few degrees of angular displacement. A ball joint 152 connects the rearward end of the longitudinal lever 140 to a transversely extending link 154 of adjustable construction. The outer end of the link 154 is connected to the lower end of a lever 156.

Referring to FIG. 12, the lever 156 is supported by a short shaft 158 that is rotatable within the housing 82 of the power steering valve 48. The inner end of the shaft 158 supports an eccentrically located pin 160 that engages a hole in the valve sleeve 86. A crescent shape slot 162 is formed in the housing 82 to accommodate angular displacement of the shaft 158 and the pin 160.

With this construction, the lever 156 and the parts connected thereto, including the eccentric pin 160, may be angularly displaced and thereby cause right or left laterally displacement of the valve sleeve element 86 for actuation of the power steering valve 48, as will be described.

The lever 156 extends upwardly from the shaft 158 and its upper end is fitted between the ends of threadedly adjustable motion limiting members 164.

If the vehicle of FIG. 1 is subjected to a cross wind blowing from the right (as viewed by the vehicle operator), the vehicle body including the frame cross member 14 will be displaced to the left relative to the road wheels 31, 32 and the suspension arms 16 and 18 connected thereto. This displacement of the chassis with respect to the suspension will cause deflection of the resilient bushings 20 and 22. The deflection of the bushings 20, 22 will be sensed by the links 130 and 134 which will cause the longitudinal lever 140 to pivot in a counterclockwise direction about the fulcrum 142, as seen in FIG. 1. The adjustable connecting link 154 will be displaced to the right which will cause the lever 156 to be rotated in a clockwise direction as seen in FIG. 2. The angular deflection of the lever 156 will be transmitted through the shaft 158 to the eccentric pin 166 which will move the valve sleeve 86 in the right-hand direction as seen in FIG. 11.

Shifting of the valve sleeve 86 in the bore 84 will produce a change in fluid flow comparable to the effect caused by displacement of the valve spool element 88. The sleeve 86 is shifted to the right (FIG. 11) in response to the displacement of the links 130 and 134 when a cross wind coming from the right (as viewed by the vehicle operator) causes relative displacement between the frame 14 and the suspension arms 16, 18. When the sleeve 56 is moved to the right, the inlet port 98 and the outlet port 122 will each be sealed off from the return port 104. The outlet port 122 will be placed in communication with the pressure inlet port 98 whereby pressure fluid will be directed to that side of the power booster cylinder 44 that will cause the piston rod 46 to be extended. Piston rod 46 will exert a force on the steering link 40 that will cause the front wheels 30, 31 to turn in the direction of a right-hand turn which will offset the effects of the cross wind.

Shifting of the valve sleeve 86 to the right will provide communication between the low pressure side of the power cylinder 44 through the valve port 110, the internal passage 116 and return port 104 to the reservoir of the fluid pressure source.

A cross wind from the left will tend to divert the vehicle in the direction of a right-hand turn. Such a wind will tend to shift the vehicle body including the frame cross member 14 to the right relative to the wheels 31, 32 and the suspension arms 16, 18. The relative movement between the frame and the suspension will cause the resilient bushings 20 and 22 to be deflected and such deflection will be sensed by the links 130 and 134. Movement of the links 130 and 134 will, in turn, cause the longitudinal lever 140 to pivot in a clockwise direction (FIG. 1). Angular displacement of the longitudinal lever 140 will be sensed by the connecting link 154 which will force the lever 156 to rotate in a counterclockwise direction (FIG. 2). The shaft 158 and the eccentric pin 160 will be correspondingly displaced whereby the valve sleeve 86 will be shifted to the left (FIG. 11).

When the valve sleeve 86 is left of center, pressure inlet 98 will be sealed off from the return port 104. The outlet port 110 will also be sealed off from the return port 104. Pressure fluid will flow from the pressure source through the inlet port 98 through the various grooves and slots, through the outlet port 110 and to that side of the pressure cylinder 44 which will cause the piston rod 46 to withdraw into the unit. The piston rod 46 will exert a force on the steering link 40 that will cause the vehicle wheels 30, 31 to be canted in a direction appropriate for a left-hand turn. This will oppose the effects of the cross wind coming from the left which would otherwise force the vehicle to drift rightwardly from its intended course.

When the piston rod 46 is forced inwardly into the cylinder 44, low pressure fluid in front of the piston will flow through the outlet port 122 and the return port 104 to the reservoir.

SUMMARY

In accordance with the present invention, a power steering system is provided for a motor vehicle that includes a power steering valve 48 which is automatically actuated when a steering load is placed upon the steering gear actuator 34. The valve assembly 48 is constructed to direct the flow of fluid under pressure to the power cylinder 44 which will exert a force that will assist in the steering operation. Also in accordance with the present invention, the power steering valve 48 is connected to the suspension system and is constructed to sense the effects of a lateral force upon the vehicle. In response to lateral displacement of the chassis with respect to the suspension, the power steering valve 48 will direct pressure fluid to the booster cylinder 44 in a manner that will compensate for forces acting upon the vehicle body that might otherwise divert the vehicle from its intended course.

The adjustable stops 164 limit the angular displacement of the lever 156 whereby the automatic adjustment provided by the interconnection of the suspension and the valve 48 will be just sufficient enough to provide the attended correction.

As the steering correction is made by the power steering valve 48 and the cylinder 44, a counter movement is generated by the valve spool actuator using the driver's hands as a reaction member. The driver will sense a variation in steering wheel torque proportional to the side force. The system is self-returning to straight-ahead when the side force diminishes.

The foregoing description presents the presently preferred embodiment of this invention. Modifications and alterations may occur to those skilled in the art that will come within the scope and spirit of the following claims.

I claim:

1. A power steering device for a motor vehicle comprising:
    a power steering valve constructed to be operatively interposed between a power steering pump and a power steering booster cylinder,
    first and second mutually independent valve control means operatively connected to said power steering valve,
    said power steering valve being constructed to direct power steering fluid from said pump to said booster cylinder in response to the actuation of either of said valve control means, one of said valve control means being constructed to be automatically actuated in response to manual actuation of a motor vehicle steering gear, sensing means constructed to provide a signal in response to a force arranged to deviate said vehicle from a predetermined course, the other of said valve control means being constructed to be automatically actuated in response to said signal provided by said sensing means, sprung and unsprung motor vehicle components, a suspension arm interconnecting said components, resilient bushing means connecting said arm to said sprung component, said sensing means constructed to provide said signal in response to deflection of said resilient bushing means.

2. A power steering device for a motor vehicle comprising:

a power steering valve having first and second valve elements, said valve elements being mutually independently displaceable, first and second mutually independent valve control means, said first valve control means being constructed to displace said first valve element, said second valve control means being constructed to displace said second valve element, said power steering valve being constructed to direct power steering fluid to a hydraulic motor that is arranged to apply a force to a motor vehicle steering linkage system in response to the displacement of either of said valve elements, one of said valve control means being constructed to displace one of said elements in response to manual actuation of a motor vehicle steering gear, sensing means constructed to provide a signal in response to a force arranged to deviate said vehicle from a predetermined course, the other of said valve control means being constructed to displace the other of said elements in response to said signal from said sensing means, sprung and unsprung motor vehicle components, a suspension arm interconnecting said components, resilient bushing means connecting said arm to said sprung component, said sensing means being constructed to provide said signal in response to deflection of said resilient bushing.

3. A power steering device for a motor vehicle, left and right dirigible vehicle wheels, left and right wheel support members connected to said wheels, steering linkage means connected to said wheel support members, a pair of laterally extending suspension arms connected at their outer ends to said wheel support members, chassis structure, resilient bushing means connecting the inner ends of said arms to said chassis structure, motion sensing means constructed to provide a signal in response to lateral motion of said suspension arms relative to said chassis structure, a power steering valve, first and second valve control means operatively connected to said power steering valve, said first and second valve control means being mutually independent, said power steering valve being constructed to direct power steering fluid to a hydraulic motor that is arranged to apply a force to said steering linkage means in response to the displacement of either said first valve control means or said second valve control means, said first valve control means being constructed to be displaced in response to a signal initiated by an operator of said motor vehicle, said second valve control means being constructed to be displaced in response to said signal provided by said motion sensing means.

4. A power steering device for a motor vehicle comprising:

a driving sprocket constructed to be connected to a steering wheel, a driven sprocket constructed to be connected to a pinion gear, a chain drivingly interconnecting said driving sprocket and said driven sprocket, a laterally translatable toothed rack in meshed engagement with said pinion gear, said rack being constructed to be connected to the steering linkage system of said motor vehicle, a chain tensioner means engaging said chain, said chain tensioner means being displaceable in response to the transmission of a force from said driving sprocket through said chain to said driven sprocket, a power steering valve having mutually independently displaceable valve elements, one of said valve elements being engageable by said chain tensioner means and displaceable in response to displacement of said tensioner means, sensing means constructed to provide a signal in response to a force arranged to deviate said vehicle from a predetermined course, the other of said valve elements being coupled to said sensing means and displaceable in response to said signal provided by said sensing means, said power steering valve being constructed to direct power steering fluid to a hydraulic motor that is arranged to apply a force to said steering linkage system in response to the displacement of either of said valve elements.

5. A power steering gear device according to claim 4 and including:

said power steering valve having a ported housing with a bore therein, one of said valve elements comprising a ported valve sleeve slidable in said bore and the other of said valve elements comprising a landed spool valve element slidable in said ported sleeve.

6. A power steering device for a motor vehicle according to claim 5 and including:

sprung and unsprung vehicle components, a suspension arm interconnecting said components, resilient bushing means connecting said arm to said sprung component, said sensing means being constructed to provide said signal in response to deflection of said resilient bushing.

7. A power steering device for a motor vehicle according to claim 4 and including:

sprung and unsprung motor vehicle components, said sensing means being constructed to provide said signal in response to lateral displacement between said sprung and unsprung components.

* * * * *